US010898831B2

United States Patent
Phillips et al.

(10) Patent No.: US 10,898,831 B2
(45) Date of Patent: Jan. 26, 2021

(54) SEPARATING DRILLING CUTTINGS AND GAS USING A LIQUID SEAL

(71) Applicant: Iron Horse Tools, LLC, Corpus Christi, TX (US)

(72) Inventors: Joel A. Phillips, Corpus Christi, TX (US); Kevin W. Baker, Luling, TX (US); J. Chris McClanahan, Corpus Christi, TX (US); Raymond H. Jordan, Crosby, TX (US)

(73) Assignee: Iron Horse Tools, LLC, Corpus Christi, TX (US)

( * ) Notice: Subject to any disclaimer, the term of this patent is extended or adjusted under 35 U.S.C. 154(b) by 15 days.

(21) Appl. No.: 15/222,339

(22) Filed: Jul. 28, 2016

(65) Prior Publication Data
US 2017/0028317 A1     Feb. 2, 2017

Related U.S. Application Data

(60) Provisional application No. 62/199,596, filed on Jul. 31, 2015.

(51) Int. Cl.
*B01D 21/34*       (2006.01)
*B01D 21/28*       (2006.01)
(Continued)

(52) U.S. Cl.
CPC ......... *B01D 21/34* (2013.01); *B01D 19/0042* (2013.01); *B01D 21/28* (2013.01); *E21B 21/065* (2013.01)

(58) Field of Classification Search
CPC ...... B01D 21/28; B01D 21/065; B01D 21/34; B01D 19/0042
See application file for complete search history.

(56) References Cited

U.S. PATENT DOCUMENTS 6,340,110 B1 *   1/2002   Nakamura ........... B23K 1/0016
                                              228/179.1
8,708,065 B2     4/2014   Largent
(Continued)

FOREIGN PATENT DOCUMENTS

CN        201851049 U     6/2011
RU          2081294 C1     6/1997
(Continued)

OTHER PUBLICATIONS

Federal Institute of Industrial Property; International Search Report & Written Opinion for PCT/US2016/063766; dated Apr. 13, 2017; 6 pages; Moscow, RU.
(Continued)

*Primary Examiner* — Bobby Ramdhanie
*Assistant Examiner* — Donovan Bui-Huynh
(74) *Attorney, Agent, or Firm* — John E. Boyd; FisherBroyles LLP

(57) ABSTRACT

A new method and device for separation of drilling cuttings from liquids and gases in air and fluid drilling operations. A liquid seal is created and maintained for proper separation of gas and liquid from cuttings and drilling slurry in air and liquid drilling. A cuttings agitation chamber is created and maintained under the liquid seal. Cuttings and particulates enter a separation vessel and fall towards the agitation chamber beneath the liquid seal and may be guided towards the agitation chamber and liquid seal by baffles or spray. Cuttings and particulates are kept in motion by nozzles in the agitation chamber for removal from the separation vessel through a discharge outlet. Outflow through the discharge outlet may be increased by a jet. The gases released from the drilling liquid exit the separation vessel through a gas outlet.

22 Claims, 4 Drawing Sheets

(51) Int. Cl.
  *B01D 19/00*   (2006.01)
  *E21B 21/06*   (2006.01)

(56) References Cited

U.S. PATENT DOCUMENTS

| | | | |
|---|---|---|---|
| 2005/0205477 A1 | 9/2005 | Eriksen | |
| 2010/0307834 A1* | 12/2010 | Largent | B09C 1/02 |
| | | | 175/206 |
| 2013/0227997 A1* | 9/2013 | Capeau | B01D 21/01 |
| | | | 71/12 |
| 2014/0034447 A1* | 2/2014 | Mathena | C10G 1/00 |
| | | | 196/46 |
| 2015/0167413 A1 | 6/2015 | Leuchtenberg et al. | |

FOREIGN PATENT DOCUMENTS

| | | |
|---|---|---|
| RU | 2451924 C2 | 5/2012 |
| RU | 156662 U1 | 11/2015 |
| SU | 1122807 A1 | 11/1984 |

OTHER PUBLICATIONS

Federal Institute of Industrial Property; International Search Report & Written Opinion for PCT/US2016/044655; dated Nov. 17, 2016; 7 pages; Moscow, RU.

International Preliminary Report on Patentability dated May 29, 2018 in related PCT/US2016/063766.

Heatec, Pump Skids, Jun. 17, 2013, p. 1 (Year: 2013).

\* cited by examiner

SEPARATING DRILLING CUTTINGS AND GAS USING A LIQUID SEAL

CROSS-REFERENCE TO RELATED APPLICATIONS

This application claims priority to U.S. application Ser. No. 62/199,596 filed Jul. 31, 2015, and entitled "SEPARATING DRILLING CUTTINGS AND GAS USING A LIQUID SEAL," which is hereby incorporated by reference herein in its entirety.

TECHNICAL FIELD

This specification relates generally to separation of drilling cuttings from liquids and gases in air and fluid drilling operations.

BACKGROUND

Drill fluid generally includes one or more of hydrocarbons, water, salt, or other chemicals or substances and is widely used in oil and natural gas drilling operations. Drill fluid may provide subsurface pressure that aids in the prevention of underground fluids from entering the borehole, it lubricates and cools the drill bit, and it carries ground up earth including shale (which may be generally referred to herein as drill cuttings solids, or cuttings), in suspension, back to the surface so that it does not interfere with drilling operations. Typically, drill fluid is injected from the surface during the drilling process down through an annular channel within the drill string. The drill fluid then exits the drill string through nozzles or apertures in the drill bit where it thereafter returns to the surface in the area between the drill string and the walls of the borehole, carrying with it the drill cuttings so that they are removed from the borehole. Various mechanical means have been proposed for separating cuttings from gas or liquid during drilling operations, and for discharging the cuttings, including discharging them into a collection pit or hauloff container.

Mist drilling is air drilling with liquid. The liquid can be water, soap, surfactants, or other chemicals. A water and soap mixture may be added to an air stream at the drilling surface at a controlled rate to improve annular hole cleaning. Many different mediums can be used for mist drilling (water, surfactants, etc.). The annular pressure increases in mist drilling, so the rate of penetration will usually be lower than in dust drilling. In mist drilling, the rate of penetration is often higher than in conventional mud drilling, which often means more cuttings to be disposed of per period of drilling. In mist drilling, drilling can proceed while producing fluids, hole cleaning capacity improves, risk of downhole fires decreases, and no nitrogen is needed. Air, mist, and fluid drilling operations typically require different dedicated-purpose gas-cuttings separators. Separators also vent gas at a safe distance from the wellbore. Inadequate separation of gas and cuttings can give rise to significant safety risks, including worker exposure to hazardous gases, and even flash fires at downstream cuttings collection stations. Accordingly, improvements are sought in enhanced separation of gases and cuttings in drilling operations to address these problems.

SUMMARY

The novel devices and methods illustrated and described here provide enhanced separation of gas and liquids from cuttings during air, mist, or fluid drilling operations through creation, maintenance and use of a liquid seal. The separation of cuttings, gases, and fluids is preferably aided by one or more of a series of baffles, agitators, and liquid level controls. The liquid seal described and illustrated here allows for use of a single class of separators for drilling operations, including air, mist, and fluid drilling operations. The novel devices and methods illustrated and described significantly reduce the amount of dust and mist discharged through the gas outlets of a separation vessel. The novel devices and methods illustrated and described also significantly reduce the amount of liquid associated with the cuttings separated from the gas, liquid, or cuttings slurry.

A liquid seal helps to ensure proper separation of gas and liquid from cuttings. The liquid seal helps enhance gas separation and improves conveyance of cuttings from the separator. Proper separation of gas and cuttings increases the safety of handling collected cuttings downstream. The novel equipment and method allows for more complete separation of liquid from cuttings and a significantly drier recovery of cuttings. Drier cuttings can result in cost savings and reduced environmental impact from decreased need of materials such as fly ash, wood shavings, or Power Pellets (™ Martlin Distributing www.martlindistributing.com) being used to solidify and manage cuttings and other liquid waste streams generated on a well site.

In some embodiments, the liquid seal is maintained at least in part by control of one or more circulation pump. The liquid seal is provided in a volume of the separation vessel substantially above a volume for agitating cuttings. In some embodiments, the cuttings agitation chamber includes one or more agitators that help assure suspension of cuttings in a slurry during outflow from the separator. The agitators may include one or more mixing nozzles supplied with pressurized liquid. In some embodiments, agitators may include one or more mixing members as befits the particular use and installation.

In some embodiments, discharge from the bottom of an agitation chamber of the cuttings slurry is aided by operation of a pressurized jet into the discharge line. Operation of a pressurized jet creates a low pressure region at the outlet of the agitation chamber.

In some embodiments, cuttings are directed into an agitation chamber by a centering baffle configured to centralize cuttings over the agitation chamber or cuttings discharge region. The centering baffle can be used to direct cuttings into the center of the separation vessel to create a swirling flow by the mixing influence of fluid streams from nozzles. A drill fluid liquid outlet line provides a passage out of the agitation chamber and out of the separation vessel. In some embodiments, a drill fluid liquid outlet line syphons liquids from below the mixing nozzles. These embodiments may be used in conjunction with the embodiments summarized above and below.

In some embodiments, a sprayer or a series of baffles, which can be used together, within the separation vessel further reduce escape of fine particulates in the gas outflow and effectively transfer particulates from the upward air flow to the downward liquid flow. In some embodiments, a sprayer is configured as a spray bar directed toward the surface of the liquid seal above the inlet of air cuttings into the separator vessel. In some embodiments, baffles above the inlet of air cuttings direct respective air, liquid, and cuttings flows.

BRIEF DESCRIPTION OF THE DRAWINGS

A more complete understanding of the present disclosure may be derived by referring to the detailed description and claims when considered in connection with the Figures, wherein like reference numerals refer to similar elements throughout the Figures, and:

DETAILED DESCRIPTION

The following description is of exemplary embodiments, but is not intended to limit the scope, applicability, or configuration of the claimed devices or methods. Rather, the following merely describes and enables the various described embodiments of the claimed devices and methods. Various changes may be made in the function and arrangement of the elements described without departing from the scope of the disclosure. It will be appreciated that the description herein may be adapted to be employed with alternatively configured devices having different arrangements, shapes, components, agitation mechanisms, baffles, chambers, nozzles, pumps, inlets, outlets, controls, and the like and still fall within the scope of the appended claims. It will also be appreciated that it is the intent behind providing examples of multiple embodiments of various aspects of the devices and methods that one aspect of one embodiment can work with other aspects of other embodiments. Thus, the detailed description that follows is for illustration not limitation.

The separation devices, systems, and methods described herein manage drill cuttings, fluids, and gases during air, mist, or fluid drilling operations. Such drilling methods previously required two separate classes of separator equipment.

Figure 1:
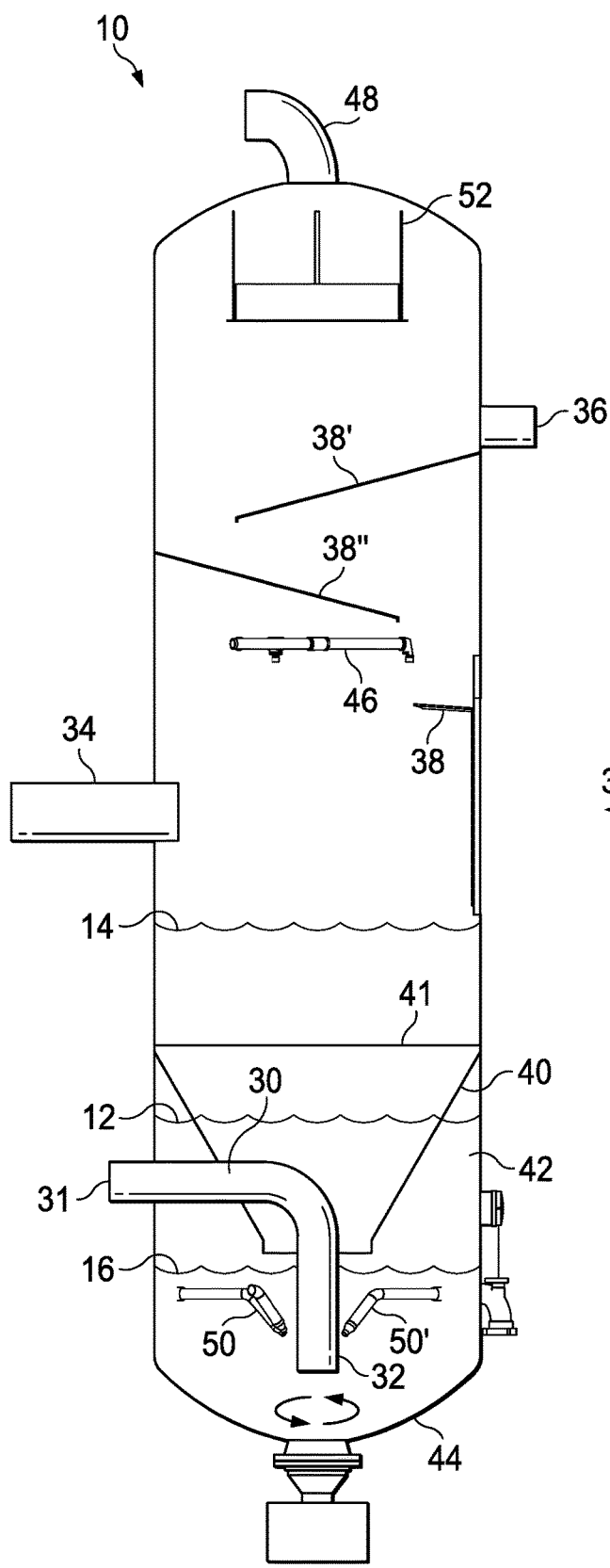
FIG. 1 illustrates a separator vessel having a liquid seal for air, mist, and fluid drilling operations according to one embodiment.
Figure 2:
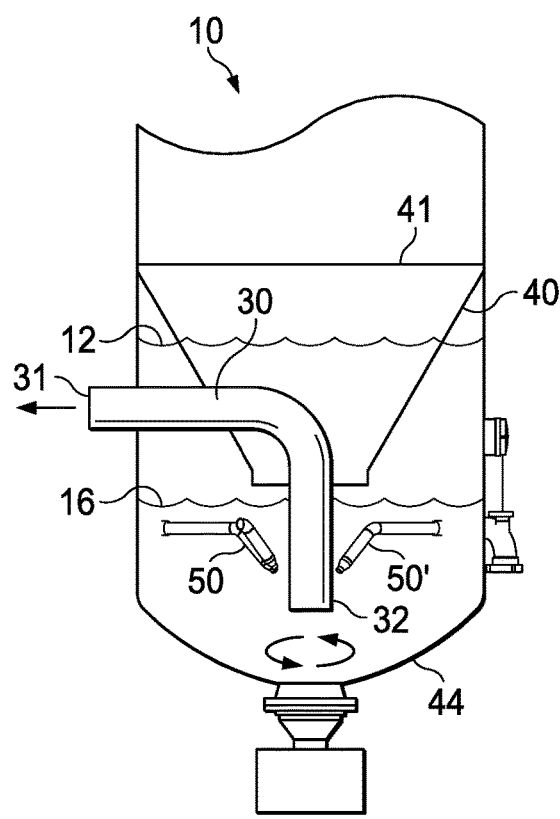
FIG. 2 illustrates a liquid seal and agitation chamber within a separator vessel according to one embodiment.
Figure 3:
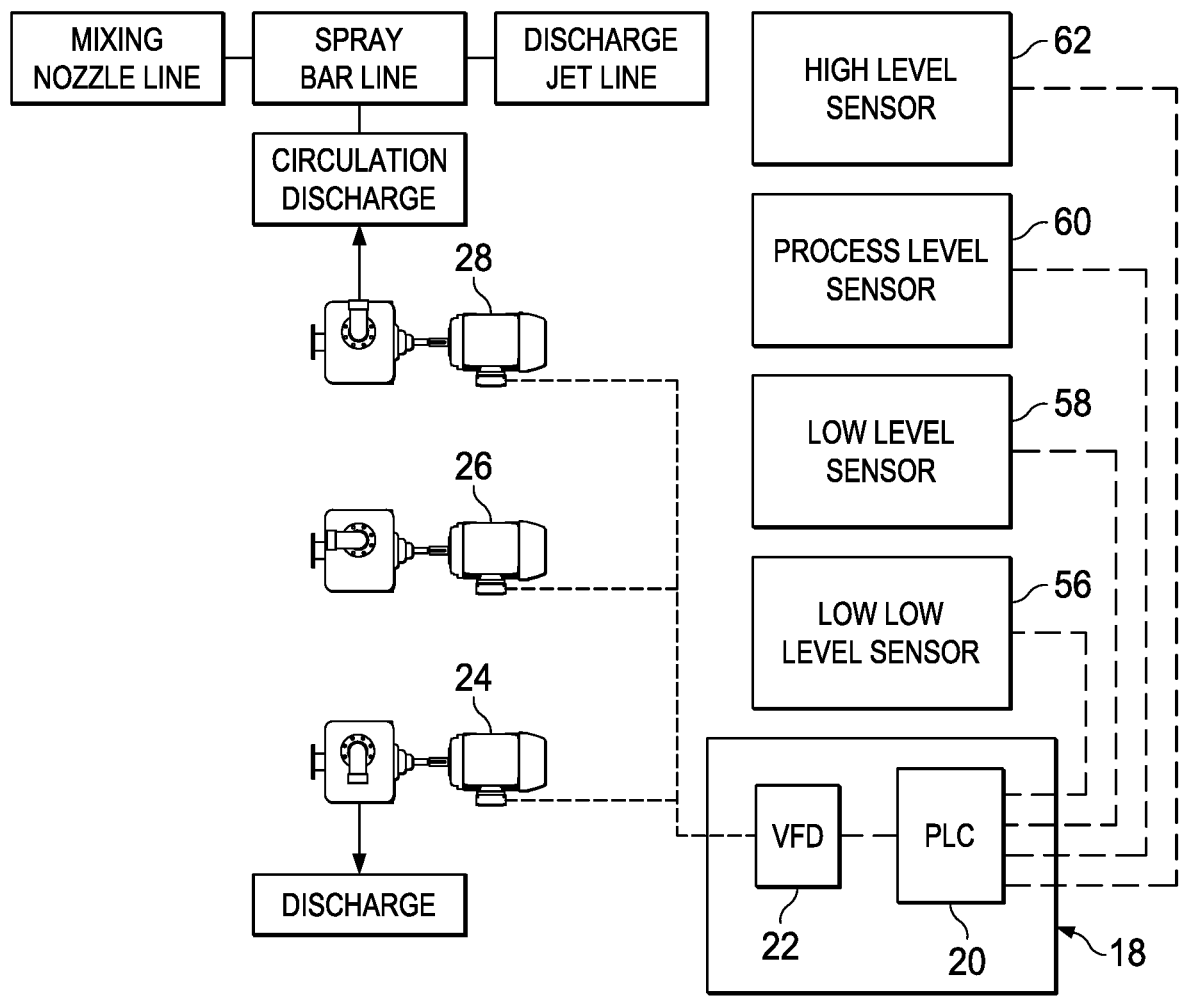
FIG. 3 illustrates a controls diagram for use in maintaining a liquid seal fluid level in the separation vessel according to one embodiment.
Figure 5:
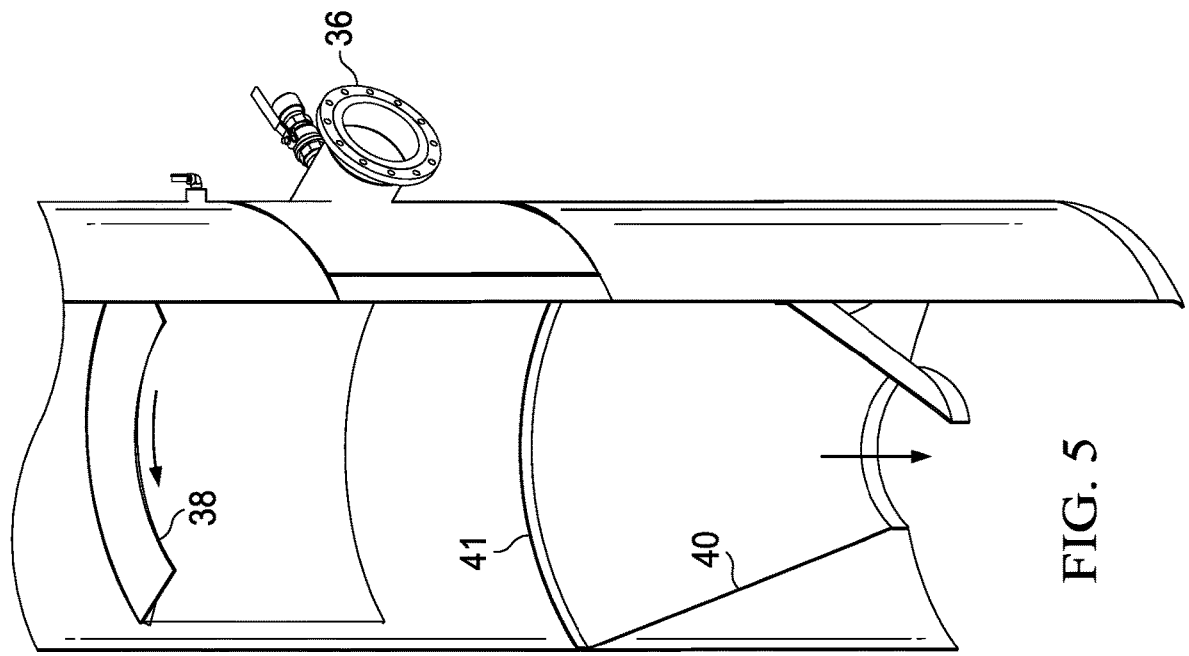
FIG. 5 illustrates a cross-sectional view of baffles within the upper space of a separator vessel having a liquid seal in yet another embodiment.

As illustrated in FIGS. 1, 2, and 3, separator vessel 10 is charged with liquid, typically water to a predetermined level referred to as the process level 12 that is maintained preferably between a high level 14 and a low level 16. Level controls may be operated from a control panel 18 and may include programmable logic controllers ("PLC") 20 or variable frequency drives ("VFD") 22, and pumps. Pumps may include discharge pumps 24, spare pumps 26, and circulation pumps 28. The liquid seal created in separation vessel 10, in one preferred embodiment, is above cuttings discharge tube 30 having outlet 31 and intake 32. Discharge tube 30 drains agitation chamber 42. In some embodiments, this liquid is continually circulated in and out of separator vessel 10 in a closed loop with a discharge pump 24 that also maintains the fluid level of the liquid seal at or near process level 12. Separation vessel 10 may include as an alternative embodiment a chevron 52 to help remove dust or moisture from the air or gases prior to exiting one or more gas outlet 48.

Separator vessel 10 receives drill cuttings from a drilling rig through air cuttings inlet 34, and the drilling fluid (mud, gas, slurry) through one or more mud, gas, slurry (MGS) inlets 36. As illustrated in FIGS. 1, 2, 4, and 5, drill cuttings are forced downward by downward baffles 38, 38', and 38" in one preferred embodiment. Fluid and cuttings are also directed by center baffle 40 to the center of separator vessel 10 into an agitation chamber 42, which is defined by the approximate area between the bottom wall 44 of separator vessel 10 and the liquid seal preferably placed at approximately process level 12. In this process, air is forced upward, around downward baffles 38, 38', and 38", one or spray bar 46, and out of separation vessel 10 though an air outlet 48. One or more sprayers 46 are placed to wet small solid particulates to prevent them from being carried upward and out of the vessel through air outlet 48. In the embodiment of FIG. 1, sprayer 46 is configured as a spray bar. Sprayer 46 may also add any suitable chemical, e.g., defoamer, surfactant, that may be required or desired.

Figure 6:
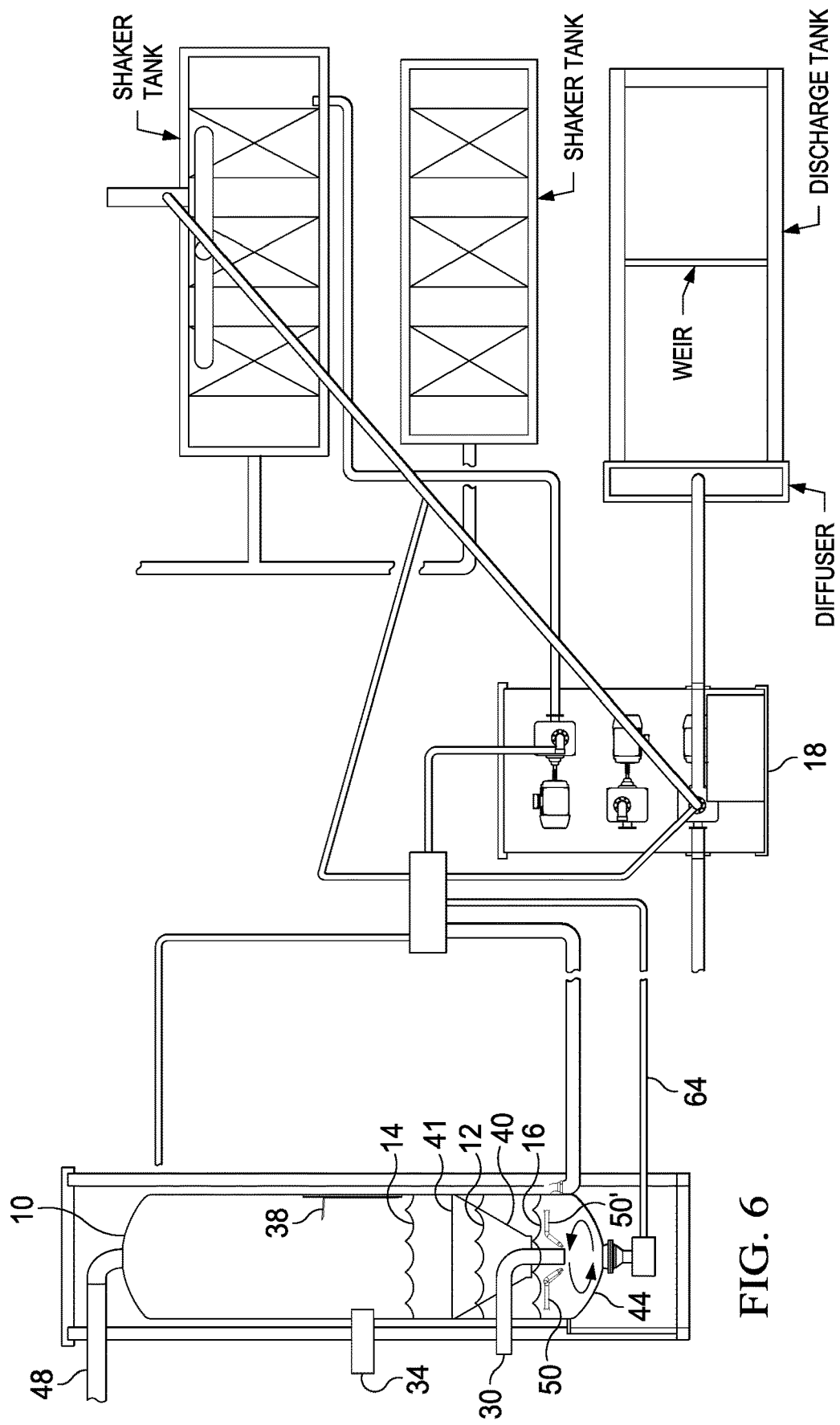
FIG. 6. illustrates an embodiment of the novel separation vessel with liquid seal in an oil and gas drilling operation.

Solids, including wetted particulates, are prevented from settling in the bottom of separation vessel 10 by operation of mixing nozzles 50, 50' that keep solids substantially moving at all times. Wetted particulates fall into the liquid at the bottom of separation vessel 10 and are discharged. In one preferred embodiment, the solids are jetted and pumped out of separation vessel 10 by aid of a jetting nozzle 64 (as illustrated in FIG. 6) charged by discharge pump 24. Solids and liquids are removed from separation vessel 10 by pumping liquid to send the solids and liquids to a diffuser or other equipment (as illustrated in FIG. 6). Liquid is recirculated back into separation vessel 10 through mixing nozzles 50, 50' and sprayer 46; this cycle is typically continuous during operation of separator vessel 10.

With continued reference to FIG. 1, separator vessel 10 includes downward baffles 38, 38', and 38", one or sprayer 46, a gas outlet 48, and agitation chamber 42. Separator vessel 10 creates a liquid seal proximate to process level 12. The liquid seal separates cuttings and gases in both air drilling and fluid drilling operations by controlling inflow and outflow of liquids. In one embodiment, during fluid drilling, the fluid and cuttings enter into separation vessel 10 by MGS inlet 36. Fluid is forced across downward baffles 38, 38', and 38". The fluid and cuttings in one preferred embodiment spread across downward baffles 38, 38', and 38" so that entrapped gases can escape and flow up and out of separator vessel 10. The solids and fluid flow down to the bottom of separation vessel 10 and fill the vessel to approximately process level 12 below which is preferably positioned above discard tube 30. The liquids and cuttings are forced into centering baffle 40 and above outlet 31 and inlet 32 of discharge tube 30. The liquid level is maintained as illustrated in FIGS. 1, 2, and 6 at approximately the height of process level 12 so as to maintain a downward pressure on outlet 31 of discharge tube 30. Fluids and cuttings can be agitated in separation vessel 10, in one preferred embodiment, by the use of mixing nozzles 50, 50' to which fluid is pumped. One additional purpose of pumping drilling fluid is to keep the system from becoming clogged.

With reference now to FIG. 2, a liquid seal approximately at process level 12 is shown at a level in separation vessel 10 slightly lower than the top rim edge 41 of centering baffle 40 and agitation chamber 42. In this embodiment, agitation chamber 42 includes mixing nozzles 50, 50' configured to agitate cuttings with a swirling action (depicted by counter current arrows) to prevent settling of solids and to enhance flowability of the suspension of solids exiting discharge tube 30 of separator vessel 10. Discharge tube 30 and discharge tube outlet 31 are positioned and configured to convey liquid from agitation chamber 42 and to help maintain the fluid level of the liquid seal atop agitation chamber 42 at approximately process level 12. In one preferred embodiment, outlet 31 of discharge tube 30 is above inlet 32 of discharge tube 30 as shown. A liquid seal is maintained by controlling the level of fluid above discharge tube 30.

Figure 4:
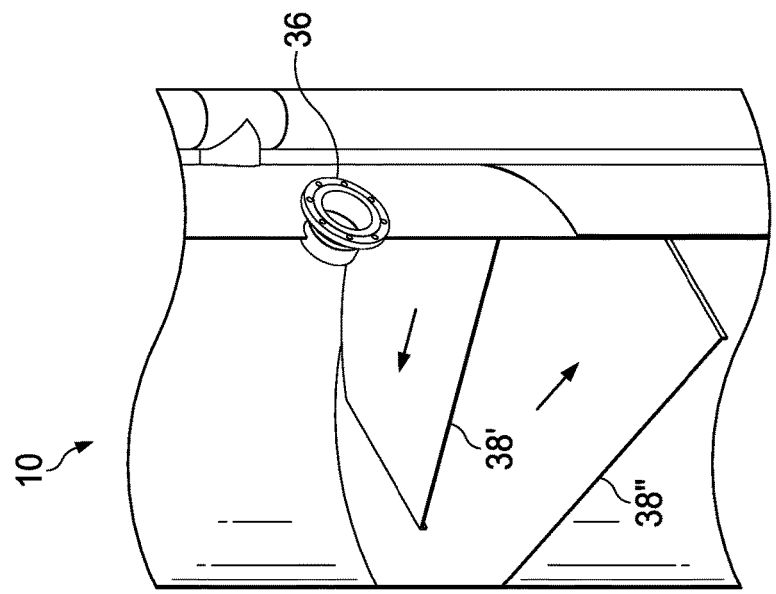
FIG. 4 illustrates a cross-sectional view of one embodiment of a centering baffle in a separator vessel having a liquid seal.

With reference now to FIGS. 3 and 4, the liquid seal level, according to one embodiment, is maintained at approximately process level 12 by control of one or more pumps, in particular discharge pumps 24 alone or in conjunction with circulation pumps 28 in response to detection of fluid levels by level sensors including low low level sensor 56, low level sensor 58, process level sensor 60, and high level sensor 62. Other and different sensors may be included to meet the needs of the particular installation. In the illustrated embodiments, variable frequency drive 22 makes discharge pump 24 a variable discharge pump. Control panel 18 controls the outflow of fluids bearing solids from the bottom of agitation chamber 42. The speed of one or more variable discharge pump is controlled to maintain the level of the liquid seal atop agitation chamber 42 in accordance with input from process level sensor 60, or from high level sensor 62 and low level sensors 56, or 58. Additional sensors can provide greater resolution of liquid levels and greater levels of pump control. Suitable sensors include mechanical sensors, harmonic sensors, or other electronic sensors, or switches configured to generate an output signal in response to the presence or absence of a fluid. Fluid level sensors 56, 58, 60, 62 are coupled to a controller 18 for controlling at least a discharge pump 24. Liquid level sensors 56, 58, 60, 62 can alternatively be used to control other pumps, including circulation pump 28, and to detect operational anomalies and to inform operators by triggering an alert, e.g., an audible or visual warning alert, or to inform upstream and downstream operators and equipment controls.

Turning now to FIGS. 3 and 6, circulation pump 28 provides pressurized fluid to the mixing nozzles 50, 50', sprayer 46, and discharge jet 64. In some embodiments, a single circulation pump can serve three high-pressure fluid delivery mechanisms. One or more additional pumps 26 can also be provided. Mixing nozzles 50, 50' agitate cuttings in agitation chamber 42 to enhance flow of suspended cuttings. In one preferred embodiment (FIG. 6), discharge jet 64 enters separation vessel 10 from below to help ensure continued flow of solids through discharge tube 30. Solid cuttings exit agitation chamber 42 to one or more cuttings collectors (represented in FIG. 6 as discharge tanks and shaker tanks). In some embodiments, one or more circulation pump 28 operates at a fixed rotational speed and operating pressure while the discharge pump 24 operates at variables speeds to maintain the desired liquid seal fluid level. In some cases, the circulation pump 28 can also be operated at variable speeds and be controlled in maintaining a desired liquid seal fluid level. Nozzles 50, 50' agitating the swirling of cuttings in agitation chamber 42 can be adjusted for flow rate and swirl pattern.

With reference now to FIGS. 1, 2, 5, and 6, centering baffle 40 concentrates and directs cuttings towards the center of agitation chamber 42 for maximum agitation there by mixing nozzles 50, 50'. An upper splash baffle 38" also helps to direct liquids and cuttings downward as they enter separator vessel 10. More than one baffle 38, 38', and 38" can help direct cuttings downward and help prevent the upward movement of cuttings and particulates towards air outlet 48. In alternative embodiments, there may be a plurality of baffles 38, 38', and 38" of a variety of sizes, shapes, and downward angles.

During the operation of separator vessel 10, cuttings, gas, and the drilling air stream or drilling fluid stream enter separator vessel 10. A series of baffles 38, 38', 38" divert solids and liquids downward towards agitation chamber 42 while allowing gas to rise upward towards one or more gas outlet 48. Operation of separation vessel 10 creates a reservoir of liquid, also referred to as a liquid seal, that is preferably maintained at approximately the lower end of separator vessel 10 to maximize separation of gases above from solids below. The liquid seal helps insure that the gas and air passing out of one or more gas outlet 48 is cleaned of particulates. The liquid seal also helps insure that the outflow of fluids and cuttings from discharge tube 30 contains significantly less fluid that was previously possible. Agitation of the solids within agitation chamber 42, by mixing nozzles 50, 50' or other means, mechanical, hydraulic, electro-mechanical, passive, or active helps maintain flowability of solids and helps release entrained gases prior to discharge of cuttings.

The liquid seal fluid level is created and then is maintained at approximately process level 12 through manipulation of discharge pump speeds in response to detection of fluid levels by various sensors. Maintenance of the fluid level is further controlled by inflow of fluid into the system and by one or more discharge pumps 24 and circulation pumps 28 supplying mixing nozzles 50, 50', discharge line jet 64, and sprayers 46. The discharge pump can in one embodiment provide a closed loop recirculation of liquids. Closed loop recirculation reduces water consumption.

The novel liquid seal system and method provides increased safety through reduction of flammable and otherwise hazardous gases that otherwise would accompany discharge of solids from a separator vessel. Drier cuttings can result in cost savings and reduced environmental impact. The system and method of the novel fluid seal in separator vessel 10 disclosed herein also saves significant time, cost, and footprint during shipping, installation, operation, maintenance, and relocation of separator vessel 10 and related equipment.

Accordingly, the novel liquid seal system and method using separator vessel 10 accommodates enhanced separation of gases and cuttings in both air drilling and fluid drilling operations. Separator vessel 10, baffles 38, 38', and 38" and other structural components may be constructed of metal, carbon fiber, composite or other material suitable for the intended operations. Similarly, while the present fluid seal system and method has been described herein for use in air drilling and fluid drilling operations, it may be readily used in any number of other industrial applications and with any number of other drilling equipment or other similar devices now known or hereafter developed.

Finally, while the fluid seal system and method has been described with reference to various exemplary embodiments, many changes, combinations and modifications may be made to the exemplary embodiments without departing from the scope of the accompanying claims. For example, the various components may be implemented in alternative ways and the various embodiments may be used with other embodiments. These alternatives can be suitably selected depending upon the particular application or in consideration of any number of factors associated with the operation of the device. In addition, the techniques described herein may be extended or modified for use with other types of devices. These and other changes or modifications are intended to be included within the scope of this disclosure.

The invention claimed is:

1. A method for separating a solids component including drilling cuttings from a slurry, the method comprising:

feeding the slurry comprising a liquids component, a gas component, and the solids component into a separation vessel having a volume, a top portion, a bottom portion, an agitation chamber within the volume of separation vessel, a cuttings outlet, a gas outlet, and mixing nozzles, wherein the solids component comprises the drilling cuttings, wherein the mixing nozzles are configured to agitate the solids component in the agitation chamber within the volume of separation vessel and wherein the cuttings outlet is positioned and configured to convey the liquids component and the solids component from the separation vessel;

feeding a fluid into the separation vessel to create a fluid volume providing a liquid seal within the agitation chamber and to cover the cuttings outlet, the liquid seal separating the gas component from the solids component and liquids component; and separating said solids component comprising the drilling cuttings from the gas component and discharging the solids component from the separation vessel through the cuttings outlet and the gas component exiting through the gas outlet, wherein the separation vessel further includes a centering baffle having a top edge rim within the separation vessel above the agitation chamber.

2. The method of claim 1 wherein the agitation chamber is between the centering baffle and the bottom of the separation vessel and the method further including feeding the fluid through the mixing nozzles into the agitation chamber.

3. The method of claim 2 further including agitating the slurry in the agitation chamber to facilitate discharge through the cuttings outlet.

4. The method of claim 1 further including directing the slurry into the center of the agitation chamber.

5. The method of claim 1, wherein the centering baffles is configured to direct the solids component towards the agitation chamber.

6. The method of claim 1 further including controlling the feeding of the fluid into the separation vessel to maintain the liquid seal within the agitation chamber and cover the cuttings outlet using a fluid sensor.

7. The method of claim 6 further including injecting the fluid into the cuttings outlet to facilitate egress of the solids component from the separation vessel and further including recirculating fluid in and out of the separation vessel.

8. The method of claim 4 further including injecting the fluid into the cuttings outlet to facilitate egress of the solids component from the separation vessel and wherein the agitation chamber is within the bottom portion of the separation vessel.

9. The method of claim 8 further including controlling the level of the liquid seal by monitoring and adjusting the fluid volume in the separation vessel.

10. A method for separating a solids component including drilling cuttings from a slurry, the method comprising:

introducing the slurry comprising a liquids component, a gas component and the solids component into a separation vessel, the separation vessel having a volume, a top portion, a bottom portion, an agitation chamber within the volume in the bottom portion of the separation vessel, a centering baffle having a top rim edge above the agitation chamber, a cuttings outlet, a gas outlet, and mixing nozzles within the agitation chamber, wherein the solids component comprises drilling cuttings and the cuttings outlet is positioned and configured to convey the solids component from the separation vessel;

feeding a fluid into the separation vessel to create a fluid volume providing a liquid seal within the agitation chamber below the top rim edge and cover the cuttings outlet, the liquid seal separating the gas component from the solids component and the liquid component;

driving fluid through the mixing nozzles to agitate the slurry with a swirling action below the liquid seal within the agitation chamber; and separating the solid components comprising drilling cuttings from the gas component and discharging the solids component from the separation vessel through the cuttings outlet.

11. The method of claim 10 further including controlling the level of the liquid seal to maintain within the agitation chamber by monitoring and adjusting the fluid volume in the separation vessel.

12. The method of claim 11 further including adjusting the fluid volume in the separation vessel by a pump.

13. The method of claim 10 further including adjusting the fluid volume in the separation vessel using a fluid level sensor.

14. A separation vessel for separating solids including drilling cuttings from a slurry, said separation vessel comprising a top portion, a bottom portion and an agitation chamber therebetween and within the separation vessel and a top ridge edge within the separation vessel above the agitation chamber, wherein the slurry comprises a liquids component, a gas component, and the solids component, said separation vessel further comprising;

an inlet for ingress of the slurry into the separation vessel;

a gas cutlet for discharging the gas component from the separation vessel, a cuttings outlet positioned and configured to convey the liquids component and the solids component from the agitation chamber; one or more mixing nozzles directed into the bottom portion of the separation vessel to agitate the solids component within the agitation chamber; and liquid level controls for feeding a fluid into the vessel to create a fluid volume providing a liquid seal within the agitation chamber lower than the top rim edge and cover the cuttings outlet to ensure separation of the gas component from the solids component and the liquids component.

15. A separation vessel for separating a solids component including drilling cuttings from a slurry, said separation vessel comprising:

a tank body having an interior, a plurality of sidewalls, a top end of the tank body, and a lower end of the tank body;

an inlet for introducing a the slurry comprising a liquids component, a gas component and the solids component into the tank body for separation;

a gas outlet at the top end of the tank body for discharging the gas component;

an outlet header at the lower end of the tank body for discharging the solids component from the tank body; and one or more mixing nozzles directed into the lower end of the tank body and configured to agitate the slurry with a swirling action within the lower end of the tank body; and at least one fluid level sensor within the tank body to monitor and adjust fluid volume in the tank body;

wherein the separation vessel is configured for feeding a fluid into the separation vessel to create a fluid volume providing a liquid seal within an agitation chamber located within the separation vessel, the liquid seal separating the gas component from the solids component and the liquids component.

16. The separation vessel of claim 15 further comprising liquid level controls for feeding the fluid to maintain the liquid seal within the agitation chamber at the lower end of the tank body and cover the outlet header, said liquid level controls comprising a pump.

17. The separation vessel of claim 16 further comprising a centering baffle for directing the slurry downward and towards the center of the agitation chamber.

18. The separation vessel of claim 14 having a centering baffle to direct the slurry into the agitation chamber.

19. The separation vessel of claim 17 having a spray bar for spraying the fluid into the interior of the tank body.

20. The separation vessel of claim 19 further including discharge jets for injecting the fluid into the outlet header to facilitate egress from the tank body and the centering baffle comprising a top rim edge above the agitation chamber.

21. The separation vessel of claim 15 further including discharge jets for injecting the fluid into the cuttings outlet to facilitate egress from the tank body and further comprising a circulation pump to continually circulate the fluid in and out of the tank body.

22. A separation vessel for separating solids including drilling cuttings from a slurry, said separation vessel comprising a top portion and a bottom portion, wherein the slurry comprises a liquids component a gas component, and the solids component, said separation vessel further comprising:

a centering baffle having a conical shape and a top rim within the separation vessel between the top portion and the bottom portion;

an inlet for ingress of the slurry into the separation vessel;

a gas outlet for discharging the gas component from the separation vessel;

a cuttings outlet positioned and configured to convey the liquids component and the solids component from the separation vessel;

one or more mixing nozzles directed into the bottom portion of the separation vessel;

wherein said separation vessel is configured for feeding a fluid into the separation vessel to create a fluid volume providing a liquid seal within an agitation chamber located within the separation vessel, the liquid seal separating the gas from the solids component and the liquids component.

* * * * *